(Model.)
W. COURTENAY.
Screw Nut.
No. 234,967. Patented Nov. 30, 1880.
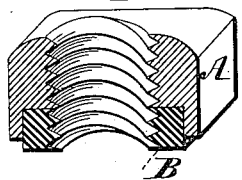
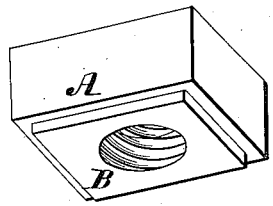
WITNESSES.
H. A. Parker
E. W. Forbes
INVENTOR.
William Courtenay per
Wyllys Hodges
his atty

UNITED STATES PATENT OFFICE.

WILLIAM COURTENAY, OF NEW YORK, N. Y.

SCREW-NUT.

SPECIFICATION forming part of Letters Patent No. 234,967, dated November 30, 1880.
Application filed June 8, 1880. (Model.)

*To all whom it may concern:*

Be it known that I, WILLIAM COURTENAY, of New York city, in the State of New York, have invented certain new and useful Improvements in Nuts, of which the following is a full, clear, and exact description, reference being had to the accompanying drawings, in which—

Figure 1 is a section, and Fig. 2 a bottom view, of the improved nut.

The invention relates first to the construction of the nut, and secondly to the materials of which it is composed.

The nut is constructed, essentially, of two parts, one of them, which is marked A in the drawings, being made of some hard or rigid material, as iron, cast, wrought, or malleable, brass, or other similar material, the essential quality being that it should have sufficient strength to serve the proper functions of a nut and also to exert the compressing action hereinafter mentioned upon the other part of the nut. It has the external shape of nuts in common use or any shape which may be desired. Into its under surface is sunk a square or polygonal depression, preferably to about half the thickness of the nut. Instead of this sink being polygonal in shape, its sides and surface may be simply roughened or corrugated sufficiently to hold the other portion of the nut, so that the two shall be firmly connected and incapable of turning the one upon the other. Into this sink is cast, run, or stamped a softer, dead, or non-elastic material, (marked B in the drawings,) such as lead, leather, or vulcanized fiber, in such manner as to form a close and solid connection with the part A. The material employed should be dead or non-elastic, so as to deaden the jar or vibration, the effect of which is to loosen the nut. The kind of deadness or non-elasticity to which I refer is that which prevents the material when indented from resuming its natural form, and would be equivalent to "plasticity" if it were not necessary that the material should have some degree of hardness or strength of figure to enable the part B to hold the part A in shape. Leather or vegetable fiber and some metallic substances possess both these qualities combined with compressibility in the right degree, while, on the other hand, rubber is deficient in them and particularly unsuitable for the purposes of my nut.

In constructing the nut it is a material advantage that the screw-thread which I cut on the part B should be cut at the same time with that on the part A, and with the same tool, so that the two threads should be perfectly continuous, and the material of the part B should therefore be of such a nature as to admit of the thread being so cut.

The part B, preferably, is thicker than the sink, so that its under or bearing surface is raised above the edges of the part A in the manner shown in the drawings, and from this arises the essential and peculiar character of the nut, although equivalent constructions might be adopted, as, for example, a washer smaller than the sink could be put under the nut, or the fish-plate or other bearing-surface could have a raised place about the bolt-hole smaller than the sink, so that the part B would come to a bearing before the part A.

The screw-thread is cut continuously on the bolt-hole through both parts A and B, so that the two constitute one continuous or solid nut.

I have discovered that the material known as vulcanized fiber has some peculiar qualities not hitherto known or made use of, which qualify it for the part B, and its use constitutes the second feature of my invention. There are some other substances of similar character which would be equivalent to it in this application, but these substances I cannot designate in any other way than by stating that they are all composed of vegetable fiber treated by processes analogous to the well-known vulcanized-fiber process—such, for example, as fiber vulcanized or gelatinized by the use of sulphuric acid.

In use, the part B, on screwing the nut down, comes first in contact with the bearing-surface, and is compressed so as to grasp tightly the bolt and its threads, and is also pressed onto and grasps the fish-plate or other bearing-surface. These actions constitute the principle of my nut, and any nut which accomplished substantially either effect by substantially the same means would be substantially like it, even if so modified in construction as not to produce the other effect.

Nuts have been before proposed which had rubber, lead, or other materials inclosed within them, and bearing upon, grasping, or squeezing the bolt; but these differ from mine in that in them the grasping effect was not produced by squeezing the yielding material between the bearing-surface and the outer or rigid part of the nut in screwing down the latter. Such nuts I do not claim, nor do I claim the use of a soft or elastic washer or other part compressed by the nut and not necessarily turning with it, or if locked to it after the nut is seated; the advantage which I propose to accomplish by my nut being that it has the grasping action of a yielding substance squeezed onto its bearing-surface and the strength of a more rigid substance, while the rigid substance has the full benefit of the grasping action because the two parts cannot turn independently without any complicated locking devices.

What I claim as my invention is—

1. The nut consisting of the part A, rigid and screw-threaded, and the part B, of a dead or non-elastic material, compressed between the part A and the bearing-surface by the screwing down of the latter, the two parts being so secured together that one cannot turn upon the other, substantially as described.

2. The nut A B, substantially as described, when the part B is composed of a material which will admit of the screw-thread being cut at the same time and with the same tool as that upon the part A.

3. The nut A B, substantially as described, when the part B is constructed of a metallic or fibrous material.

4. The nut A B, substantially as described, when the part B is constructed of vulcanized fiber or its equivalent.

WILLIAM COURTENAY.

Witnesses:
JOHN B. TRULL,
E. J. MITCHELL.